Feb. 13, 1968     L. D. PADULA     3,368,788
MAGNETIC LATCH VALVE

Filed May 12, 1965     2 Sheets-Sheet 1

INVENTOR
LAWRENCE D. PADULA

BY *Lindsey, Prutzman and Hayes*
ATTORNEYS

Feb. 13, 1968  L. D. PADULA  3,368,788
MAGNETIC LATCH VALVE
Filed May 12, 1965  2 Sheets-Sheet 2
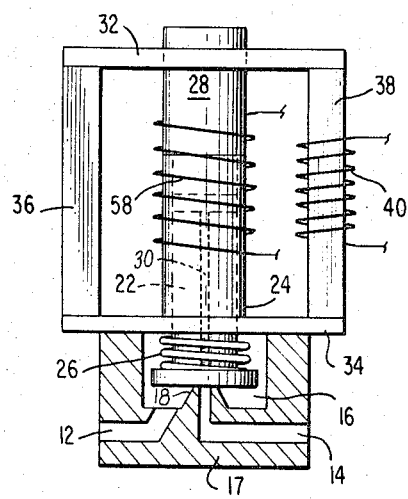
FIG. 4
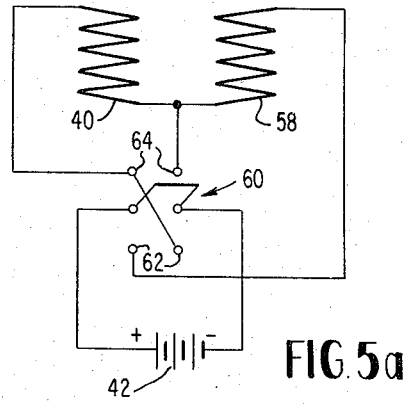
FIG. 5a
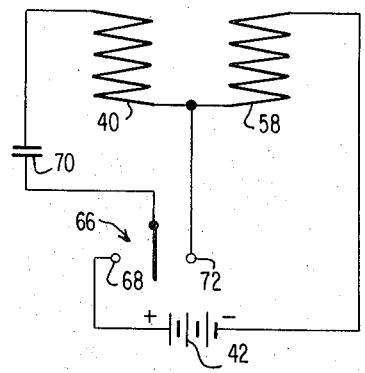
FIG. 5b
FIG. 6
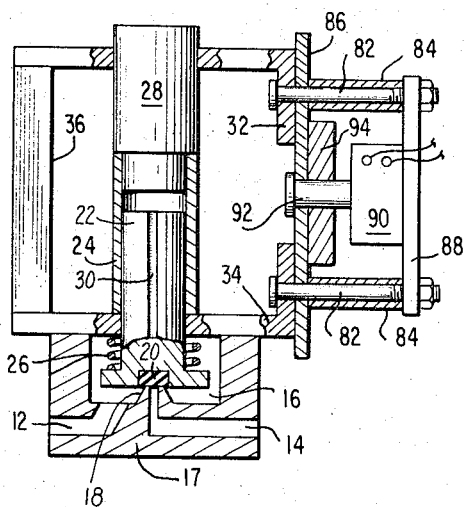
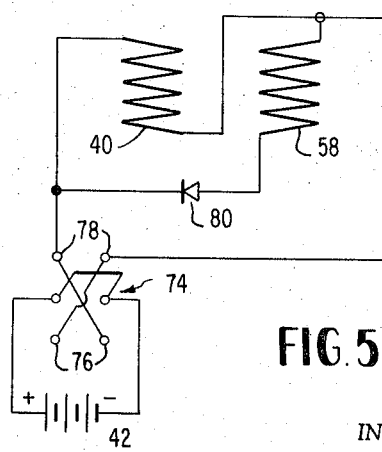
FIG. 5c
INVENTOR
LAWRENCE D. PADULA
BY *Lindsey, Prutzman and Hayes*
ATTORNEYS United States Patent Office 3,368,788
Patented Feb. 13, 1968

3,368,788
MAGNETIC LATCH VALVE
Lawrence D. Padula, New Britain, Conn., assignor to Skinner Precision Industries, Inc., New Britain, Conn., a corporation of Connecticut
Filed May 12, 1965, Ser. No. 455,087
10 Claims. (Cl. 251—65)

ABSTRACT OF THE DISCLOSURE

The valve of this invention includes a valve body and a plunger cooperating therewith and movable between open and closed fluid control positions, a pair of flux sources individually disposed in separate closed magnetic circuit relation to the plunger in both fluid control positions of the plunger, and means for selectively reversing the polarity of one of the flux sources to steer flux into or away from the plunger for establishing a magnetic force of attraction with respect to the plunger for operating the valve.

This invention relates in general to a magnetically controlled latching valve, and more particularly to a novel plunger-type valve which employs both permanently and reversibly polarized flux sources to effect its operating functions.

It is a primary object of this invention to provide a novel and improved magnetic latch valve.

It is a further object of this invention to provide such a valve which is rugged, dependable, economical to manufacture and simple to operate, and which provides and utilizes a unique coaction between a permanently polarized flux source and a reversibly polarizable flux source to achieve its opening, closing and latching functions.

Other objects will be in part obvious and in part pointed out more in detail hereinafter.

The invention accordingly consists in the features of construction, combination of elements and arrangement of parts which will be exemplified in the construction hereafter set forth and the scope of the application which will be indicated in the appended claims.

In the drawings:

FIG. 4 shows a modification of the valve shown in FIG. 1 including an additional electric coil;

FIGS. 5a, 5b and 5c show schematic diagrams of electrical circuits that may be employed in conjunction with the valve shown in FIG. 4; and FIG. 6 shows a further embodiment of the invention employing a rotatable permanent magnet as the reversible flux source.

Figure 1:
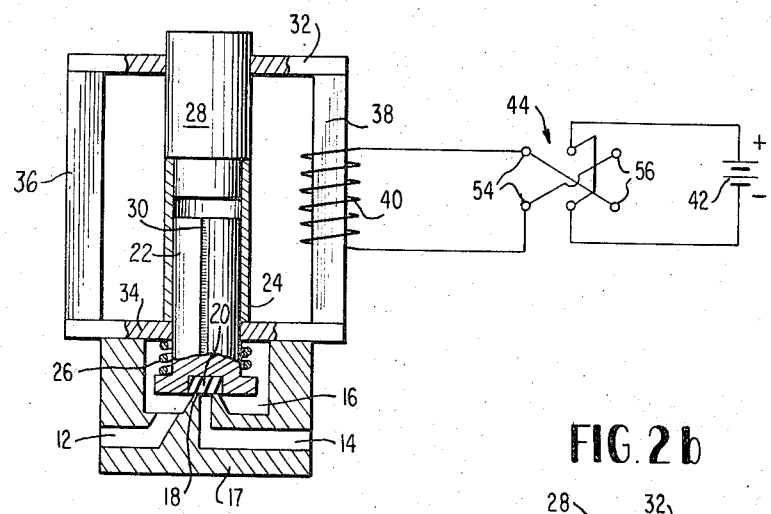
FIG. 1 shows a sectional view of a magnetic latching valve constructed in accordance with the teachings of this invention.

Referring now to the drawings, in which the same reference numerals have been used throughout the various figures to designate like structural elements, FIG. 1 shows a plunger-type magnetic latching valve having a fluid inlet port 12 and a fluid outlet port 14 communicating with each other through a central chamber 16 within a base member or valve block 17. The interior end of the fluid passage associated with outlet port 14 terminates in an upwardly projecting, conical valve seat 18 which cooperates with a resilient seal 20 centrally inserted in the flanged lower face of a reciprocable plunger 22. The plunger may move to a limited degree within a cylindrical sleve 24 and is biased toward a closed position as shown by a helical expansion spring 26 surrounding its lower end. An abutment plug 28 is fitted into the upper end of the sleeve 24 to define the upper limit of travel for the plunger 22. The plunger 22 is also provided with longitudinal slots such as at 30 to permit pressure equalization of the central chamber 16 and the pocket formed between the plug 28 and the plunger 22 as the latter moves from one position, either open or closed, to the other.

A pair of plate members 32 and 34 surround and extend outwardly from the plug 28 and the plunger 22, respectively, and serve as passive legs for the overall magnetic circuit. The plate members, the plug and plunger are all fabricated from a material having very low reluctance and negligible magnetic retentivity, such as soft iron. A permanent magnet 36 extends between the plate members at their left extremities in the figure and a reversibly polarizable magnet 38 extends between the members at their right extremities, thus forming a closed loop magnetic circuit having a central leg including the plug and the plunger. The magnet 38 is provided with a switching coil 40 whose energizing circuit includes a battery 42 which may be connected to the coil in a selected polarity through a double pole-double throw reversing switch 44.

Figure 3:
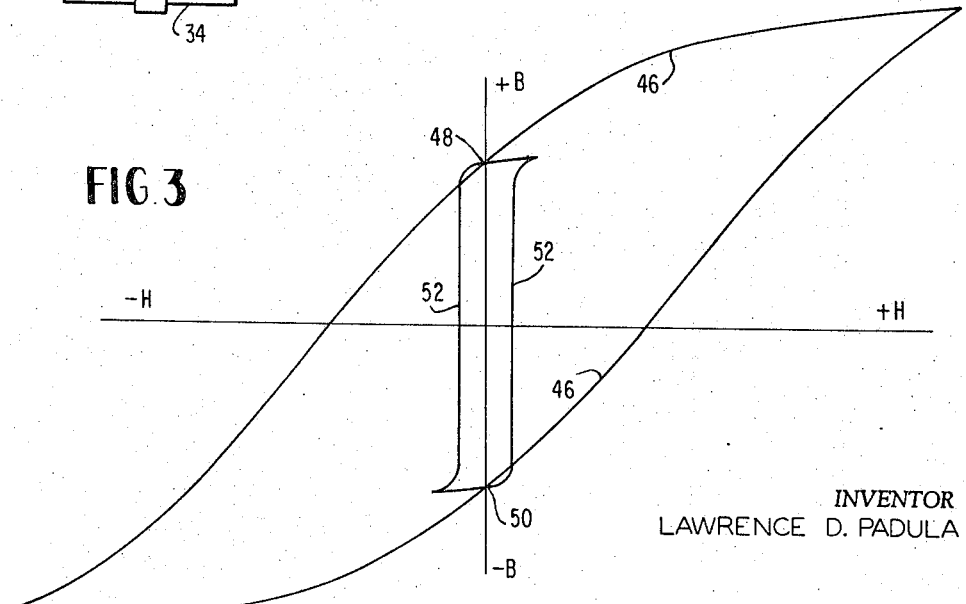
FIG. 3 shows a co-ordinate plot of the hysteresis loops that characterize the permanent and reversible magnetic materials employed in the valve construction of FIG. 1.

The permanent magnet 36 is preferably fabricated from an alloy material, such as Alnico VIII, which has a high coercive force and very high magnetic retentivity. Such a material might be characterized by the hysteresis loop 46 shown in FIG. 3, where point 48 represents the positive level of remanent flux density and point 50 represents the negative level with no external magnetization or demagnetization forces applied. The reversibly polarizable magnet 38, on the other hand, is formed from a ferrite material which has a substantially rectangular hysteresis loop, as indicated by curve 52 in FIG. 3. This type of material is characterized by its ability to be rapidly switched from one stable magnetic state or polarity to the other with a low magnetizing force, and it is widely employed in the data processing arts because of this "storage" ability. The parameters of the magnets 36 and 38 are preferably chosen so that they both establish substantially the same flux levels in their remanent states, for reasons which will be more apparent below. If the remanent flux densities of both magnets are equal, as shown in FIG. 3, then their cross-sectional areas must also be equal to result in identical total flux levels. The magnet 38 need not occupy the entire outer leg of the magnetic circuit as shown, but may be merely a small slug of ferrite material inserted in the leg, the remainder of which may be soft iron. As stated above, the only essential criterion is that the remanent flux levels of both magnets be approximately equal.

Figure 2A:
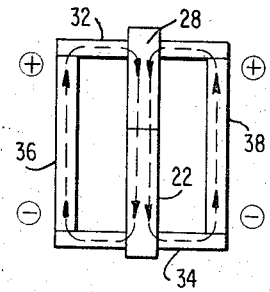
FIGS. 2a and 2b show simplified representations of the valve shown in FIG. 1 and illustrate the magnetic polarities and flux patterns that exist when the valve is open and closed, respectively.

In considering the operation of the magnetic latching valve, let it be assumed that the valve is initially open, that is, the plunger 22 is in its raised or upper position, and that the magnets 36 and 38 have the polarities shown in FIG. 2a. Under these conditions the magnets are bucking each other and, since their remanent flux levels are approximately equal, most of the flux established by them flows down through the central leg of the magnetic circuit as shown by the arrows in the figure. This creates a magnetic force of attraction between the plunger 22 and the plug 28 sufficient to overcome the counterforce of the biasing spring 26 and latch the valve in its open position.

Figure 2B:
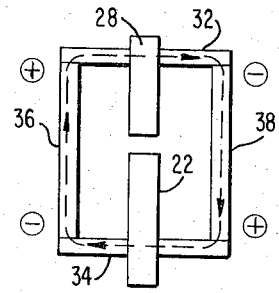

If it is now desired to close the valve, the reversing switch 44 is momentarily closed on its left hand set of contacts 54. This sends a pulse of current through coil 40 in the proper direction to switch or reverse the polarization of magnet 38, and the magnetic circuit polarities now appear as shown in FIG. 2b. The magnets 36 and 38 are now aiding each other and substantially all of the flux flows through the outer legs of the magnetic circuit as shown by the arrows in the figure. With little or no flux flowing through the central leg of the circuit, and therefore creating no appreciable force of attraction between the plunger and the plug, the biasing spring 26 forces the plunger into its lower or down position, thereby compressing the seal 20 against the seat 18 and closing the valve. When the plunger moves down an air gap is created between the plunger and the plug, as shown in FIGS. 1 and 2b, which increases the reluctance of the central leg and further decreases its already minimal flux level.

To again open the valve, it is only necessary to momentarily close the reversing switch 44 on its right hand set of contacts 56. This pulses coil 40 in a direction to switch or reverse the polarity of magnet 38 back to the condition shown in FIG. 2a. The fluxes established by magnets 36 and 38 now buck or oppose each other, flow through the central leg, and create a magnetic force of attraction between the plunger 22 and the plug 28 sufficient to overcome the biasing force of spring 26 and raise the plunger. This in turn closes the air gap which lowers the reluctance of the central leg and further increases its flux level, thereby latching the valve in its open position.

It will be appreciated that the coil energizing circuit shown in FIG. 1 is exemplary only, and any number of well known circuit configurations could be employed to pulse the reversing coil with equal facility. As one example, a series wound compound coil could be used with a center tap connected to one of the battery terminals and separate single pole, single throw switches connected between the other battery terminal and the opposite ends of the coil. The momentary closing of one of the switches would then send a pulse of current through its associated half of the coil in one direction, while the closing of the other switch would pulse the other half of the coil in the opposite direction.

FIG. 4 shows a further embodiment of the invention in which an additional coil 58 has been provided surrounding the central leg of the magnetic circuit. Its purpose is to create an additional, highly concentrated flux across the air gap of the closed valve to facilitate the raising of the plunger 22. When the plunger is in the down position, the central leg of the magnetic circuit has a very high reluctance due to the air gap and a considerably greater magnetomotive force is required to raise the plunger than is necessary to merely latch it or hold it in its raised position, since in the latter case the air gap is closed and the central leg reluctance is comparatively low. With coils 40 and 58 wound and connected so as to generate additive flux when simultaneously energized, a large force is created across the air gap to raise the lowered plunger. To close the valve, on the other hand, it is only necessary to divert the majority of the flux lines away from the central leg and through the outer magnetic circuit including the two magnets and the plate members 32 and 34, since the spring 26 provides the required closing force. Circuitry is therefore provided to energize both coils 40 and 58 when opening the valve but only coil 40 when closing the valve. Exemplary circuits to implement this function are shown in FIGS. 5a, 5b and 5c.

In FIG. 5a, coils 40 and 58 are simultaneously energized by the battery 42 when reversing switch 60 is closed on contacts 62. When the switch 60 is closed on contacts 64, however, coil 40 alone is energized in the reverse direction. With the circuit of FIG. 5b, the coils 40 and 58 are both energized when switch 66 is closed on terminal 68 until capacitor 70 charges to the potential level of the battery. When the switch is transferred to terminal 72, the capacitor discharges through coil 40, thus pulsing it in the opposite direction to close the valve. In FIG. 5c, the coils 40 and 58 are connected in parallel and both are energized when reversing switch 74 is closed on contacts 76. When contacts 78 are engaged, however, diode 80 blocks the flow of current through coil 58 and only coil 40 is pulsed in the opposite direction.

It will be appreciated that the coil or coils in FIGS. 1 and 4 need only be energized for very short time intervals to effect the desired valve action since the ferrite material employed in the reversible magnet 38 is capable of almost instantaneous switching or polarity reversal.

The essential operating condition of the magnetic latching valves shown in FIGS. 1 and 4 is that the polarity of one of the flux sources be reversible. While this may be implemented by means of a reversibly polarizable magnet as described above, this same condition may also be met by physically rotating a permanent magnet 180°, and a latching valve structure for accomplishing this is shown in FIG. 6. Essentially, the plate members 32 and 34 are L-shaped and receive mounting bolts 82 provided with spacer sleeves 84. A plate 86, which may be fabricated from any type of high reluctance, non-magnetic material, such as brass, is held against the members 32 and 34 and a motor plate 88 is carried on the outer extremities of the bolts. A drive motor 90 is mounted on the plate 88 as shown and its armature shaft 92, which is journaled for rotation in the pivot plate 86, carries a permanent bar magnet 94 which bears against the plate 86. Without going into detail, it will be readily understood that when the poles of magnet 94 are physically aligned with the ends of the members 32 and 34, a given flux relationship between the two permanent magnets will be established, either aiding or bucking. When the magnet 94 is rotated 180° by appropriately energizing the drive motor 90, the existing flux relationship will be reversed, from aiding to bucking or vice versa, and the desired valve action will be effected.

It will be appreciated that the effective polarity reversal of a permanent magnet may be implemented in a great many ways other than by rotation with the same operative result. As one example, a manually or automatically movable slide plate may be provided between the extremities of the L-shaped members 32 and 34. The slide plate may carry a pair of oppositely aligned permanent bar magnets separated by a soft iron shield such that either one of the magnets may be positioned so as to bridge the gap between the members 32 and 34, thereby completing the magnetic circuit with either an aiding or bucking polarity relationship.

As may be seen from the foregoing, this invention provides a novel and improved magnetic latching valve in which permanently and reversibly polarized flux sources are employed to effect a flux steering function which in turn implements the valve opening, closing and latching actions.

As will be apparent to persons skilled in the art, various modifications and adaptations of the structure above-described will become readily apparent without departure from the spirit and scope of the invention, the scope of which is defined in the appended claims.

I claim:
1. A magnetically operated valve, comprising:
 (a) a valve body including fluid inlet means, fluid outlet means and a valve seat disposed between the inlet and outlet means,
 (b) a plunger slidably adjacent the valve body and adapted to cooperate therewith in establishing open and closed fluid control positions relative to the valve seat,
 (c) a pair of flux sources disposed in a closed magnetic circuit relationship with the plunger in both open and closed fluid control positions of the plunger, and
 (d) means for selectively reversing the polarity of one of the flux sources to steer flux into or away from the plunger, whereby a magnetic force of attraction may be established with respect to the plunger for operating the valve.

2. A magnetically operated valve as defined in claim 1 wherein:
(a) the pair of flux sources comprises a permanent magnet and a reversibly polarizable magnet, and
(b) the means for selectively reversing the polarity of one of the flux sources comprises an electrical coil wound around the reversibly polarizable magnet and an energizing circuit therefor.

3. A magnetically operated valve as defined in claim 2 further including spring means for biasing the plunger toward the valve seat.

4. A magnetically operated valve as defined in claim 3 further including an additional electrical coil wound around the plunger for selectively generating a flux which is additive with that generated by the reversibly polarizable magnet to assist in operating the valve.

5. A magnetic latch valve, comprising:
(a) a valve body including fluid inlet means, fluid outlet means and a valve seat disposed between the inlet and outlet means,
(b) a plunger slidably mounted adjacent the valve body and adapted to cooperate with the valve seat,
(c) means for biasing the plunger toward the valve seat to close the valve,
(d) a stop member axially mounted with respect to the plunger and defining an air gap therewith,
(e) a pair of flux sources individually disposed in separate, closed magnetic circuits with the plunger and the stop member, the pair of flux sources and the plunger and stop member forming at least in part three parallel legs of a combined, closed magnetic circuit, and
(f) means for selectively reversing the polarity of one of the flux sources to steer flux into or away from the plunger and stop member, whereby a magnetic force of attraction may be established for moving the plunger toward the stop member to open the valve and close the air gap and wherein the valve is thereafter latched in the open position by reason of an increased force of attraction due to the closing of the air gap.

6. A magnetic latch valve as defined in claim 5 wherein:
(a) the pair of flux sources comprises a pair of permanent magnets, and
(b) the means for selectively reversing the polarity of one of the flux sources comprises means for rotating one of the permanent magnets through an arc of 180°, 7. A magnetic latch valve as defined in claim 5 wherein:
(a) the pair of flux sources comprises a permanent magnet and a reversibly polarizable magnet, and
(b) the means for selectively reversing the polarity of one of the flux sources comprises an electrical coil wound around the reversibly polarizable magnet and an energizing circuit therefor, 8. A magnetic latch valve as defined in claim 7 further including an additional electrical coil wound around the plunger and stop member for selectively generating a flux which is additive with that generated by the reversibly polarizable magnet to assist in opening the valve.

9. A magnetic latch valve as defined in claim 7 wherein:
(a) the plunger and stop member are fabricated from a material having low magnetic reluctance and negligible magnetic retentivity, and
(b) the reversibly polarizable magnet has a substantially rectangular hysteresis loop.

10. A magnetically operated valve comprising:
(a) a valve body including fluid inlet means, fluid outlet means and a valve seat disposed between the inlet and outlet means,
(b) a plunger slidably mounted adjacent the valve body and adapted to cooperate with the valve seat,
(c) a pair of flux sources comprising a pair of permanent magnets disposed in a closed magnetic circuit relationship with the plunger, and
(d) means for selectively reversing the polarity of one of the flux sources comprising means for rotating one of the permanent magnets through an arc of 180° to steer flux into or away from the plunger, whereby a magnetic force of attraction may be established with respect to the plunger for operating the valve.

References Cited
UNITED STATES PATENTS

| 2,579,723 | 12/1951 | Best | 251—65 |
| 3,164,001 | 1/1965 | Yoshinaga | 251—65 X |
| 3,203,447 | 8/1965 | Bremner et al. | 251—65 X |

FOREIGN PATENTS

| 597,145 | 8/1925 | France. | |

OTHER REFERENCES

IBM Technical Disclosure Bulletin, volume 6, No. 5, October 1963.

M. CARY NELSON, *Primary Examiner.*

R. C. MILLER, *Assistant Examiner.*

UNITED STATES PATENT OFFICE
CERTIFICATE OF CORRECTION

Patent No. 3,368,788                                    February 13, 1968

Lawrence D. Padula

It is hereby certified that error appears in the above numbered patent requiring correction and that the said Letters Patent should read as corrected below.

Column 4, line 65, after "slidably" insert -- mounted --.

Signed and sealed this 22nd day of April 1969.

(SEAL)
Attest:

Edward M. Fletcher, Jr.                                   EDWARD J. BRENNER
Attesting Officer                                           Commissioner of Patents